March 21, 1933.  E. W. MENTOR ET AL  1,902,289
GRAIN DISTRIBUTING MEANS FOR COMBINES
Filed March 11, 1929  2 Sheets-Sheet 2

Witness:
William P. Kilroy

Inventors
Earl W. Mentor
Charles J. Scranton Jr.
By Brown, Jackson, Boettcher & Dienner.
Attys Patented Mar. 21, 1933

1,902,289

UNITED STATES PATENT OFFICE

EARL W. MENTOR AND CHARLES J. SCRANTON, JR., OF PEORIA, ILLINOIS, ASSIGNORS TO AVERY POWER MACHINERY CO., OF PEORIA, ILLINOIS, A CORPORATION OF ILLINOIS

GRAIN DISTRIBUTING MEANS FOR COMBINES

Application filed March 11, 1929. Serial No. 345,916.

This invention relates to combined harvesting and threshing machines, commonly termed combines, and has to do more particularly with distribution of the cut or harvested grain, so as to assure proper feed thereof throughout the whole length of the separator cylinder and concave.

In combines, as commonly constructed, the platform or header elevator enters the feed house at one side thereof and the greater part of the cut grain is ordinarily delivered to the feed conveyor adjacent the other side of the feed house. This is highly objectionable, as it results in overloading the cylinder at one side, causing slugging and stopping thereof, as well as uneven wear on the cylinder and concave teeth.

This feeding of the greater part of the harvested grain to the cylinder and concave at one side is also objectionable as causing great wastage and poor cleaning on account of the heavy load going over the rack and grain pan and sieves at one side of the machine. It is a common practice to employ a rotating beater in the feed house above the feed conveyor, this beater having blades or equivalent elements which extend parallel to the slats of the feed conveyor. The beater is disposed to engage the cut grain on the feed conveyor to assist in feeding of this cut grain to the cylinder and concave. While this beater assists feeding of the cut grain, it does not in any way avoid the serious objections above noted, which result from feeding the greater part of the cut grain to the cylinder and concave at one side thereof.

The main object of our invention is to provide simple and efficient means whereby a part of the cut grain which is delivered to the feed conveyor on one side thereof will be shifted toward the other side of the feed conveyor, so as to be distributed substantially uniformly throughout the entire width of the feed conveyor, assuring that the cut grain will be delivered to the cylinder throughout the entire length thereof. By thus distributing the cut grain upon the feed conveyor, we avoid the objections above noted, which are inherent in the present construction of combines referred to, and produce a combine of greatly increased efficiency. We have found that the desired distribution of the cut grain on the feed conveyor can be accomplished by providing deflecting means above this conveyor, such means being disposed to engage the cut grain and shift or deflect it toward the header elevator side of the feed conveyor.

The means for accomplishing this desired distribution of the cut grain may assume various forms. In the preferred form illustrated by way of example, we provide a beater having blades so disposed relative to the feed conveyor as to accomplish the desired distribution of the cut grain. In its broader aspects, our invention comprehends any suitable means for accomplishing the distribution of the cut grain throughout substantially the entire width of the feed conveyor or equivalent feed means used in a combine. More specifically, and in its preferred form, our invention comprises a rotating beater having blades so disposed as to engage the cut grain at an angle to the slats of the feed conveyor and which serve to distribute the cut grain on the feed conveyor in the manner stated. Further objects and advantages of our invention will appear from the detailed description.

Figure 1:
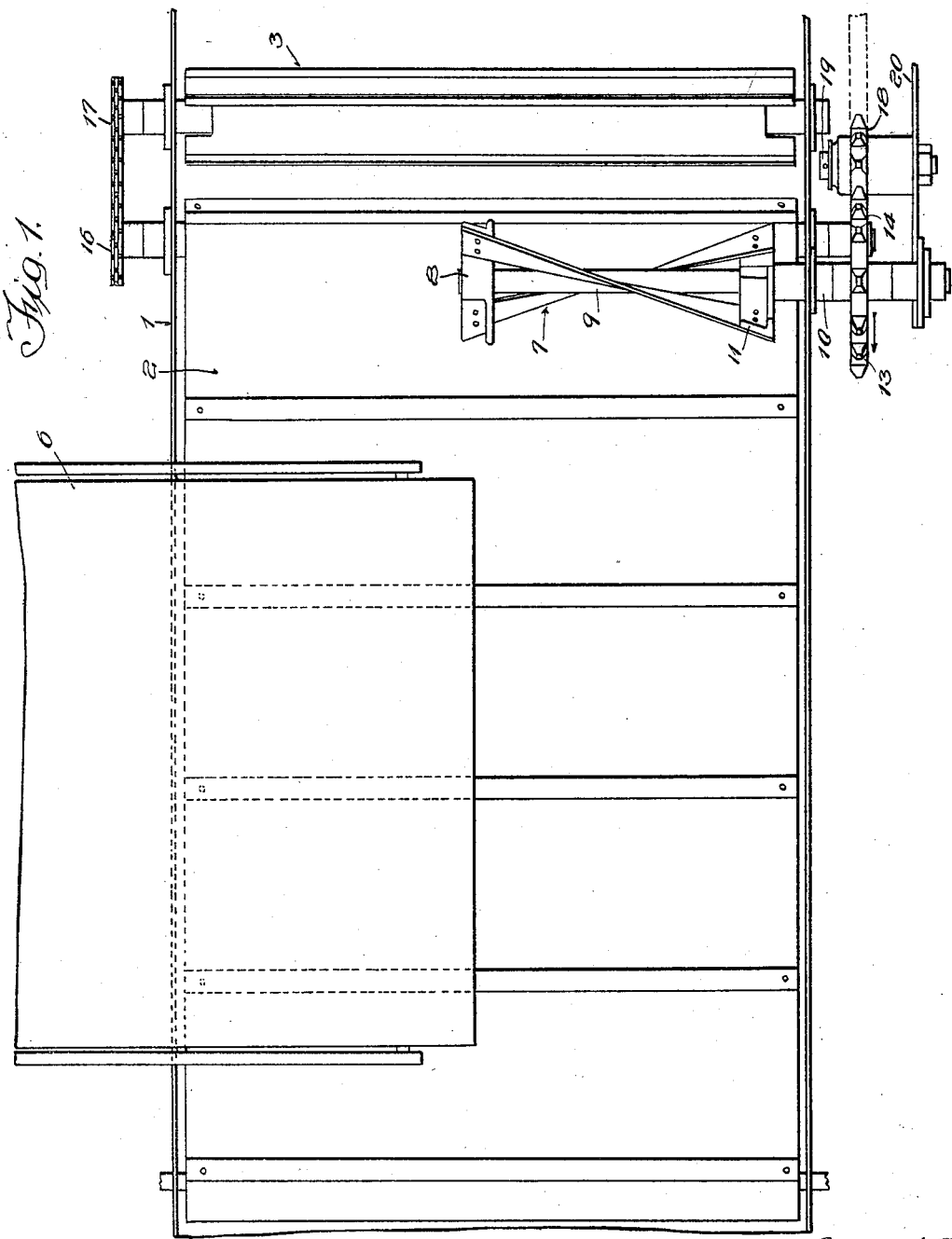
Figure 1 is a plan view of a feed house and feed conveyor and associated parts of a combine, illustrating our invention as applied thereto, the top of the feed house being omitted and parts being broken away for clearness.

We have illustrated our invention as applied to a combine comprising a feed house 1 in which is mounted the feed conveyor 2 which delivers the harvested grain to an accelerating feed roll 3 disposed between feed conveyor 2 and cylinder 4 and concave 5, respectively, of the separating mechanism. The accelerating feed roll 3 removes the grain from the conveyor 2 and delivers it to the cylinder and concave. This feed roll 3 constitutes the subject matter of the copending application of James N. Reynolds and Charles J. Scranton, Jr., for accelerating feed roll, filed March 5, 1929, Serial No. 344,371. It is not thought necessary to illustrate or describe this roll in more detail here, it being sufficient to note that this roll is preferably employed. It is particularly pointed out, however, that this roll forms no part of the present invention and, if desired, the roll 3 may be omitted, in which case the turnback or delivery end of the feed conveyor 2 will be disposed closely adjacent the cylinder and concave in accordance with present practice.

A platform or header elevator 6 extends into the feed house 1 from one side thereof and delivers the cut grain to the feed conveyor 2 in a known manner. Due to the fact that the elevator 6 projects into the feed house 1 above feed conveyor 2, and the momentum imparted to the cut grain during travel thereof with the elevator 6, the greater part of the grain is ordinarily deposited upon feed conveyor 2 at the side of the house 1 opposite to elevator 6.

To avoid this objection, we provide means whereby a part of the cut grain initially delivered to feed conveyor 2 upon one side thereof is shifted or deflected toward the other side of the conveyor, so as to be distributed substantially uniformly throughout approximately the full width of such feed conveyor. As previously noted, the means employed to accomplish this result may assume numerous forms.

Figure 2:
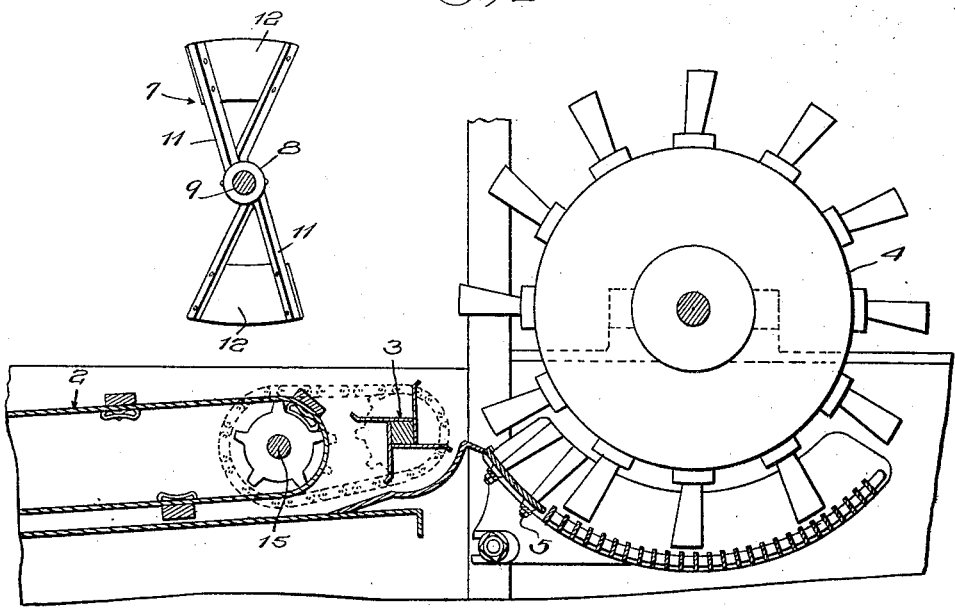
Figure 2 is a fragmentary vertical sectional view through the feed house and the cylinder and concave of a combine, illustrating our invention as applied, parts being shown in elevation and the concave being illustrated more or less diagrammatically.

In Figures 1 and 2 of the drawings, we have illustrated a beater 7 above the feed conveyor 2, this beater projecting inwardly of house 1 from the side thereof opposite to the header elevator 6. The beater 7 comprises end heads 8 which are pinned or otherwise suitably secured upon a shaft 9 rotatably mounted through a bearing sleeve 10 secured to the side wall of feed house 1. Each of the heads 8 is provided with two arms 11 which are disposed substantially diametrically opposite each other and approximately radially of the head. These heads are disposed in different angular relation to the shaft 9 and are connected together, through the medium of arms 11, by blades or vanes 12 secured to these arms. The blades 12 extend across the axis of shaft 9 and are slightly twisted transversely at their central portions due to the difference in position of arms 11 relative to the shaft. This produces a beater of approximately spiral construction.

A sprocket wheel 13 is secured on shaft 9, adjacent the outer end of bearing sleeve 10. This wheel receives a sprocket chain which also passes under a sprocket wheel 14 secured on drive shaft 15 of feed conveyor 2. A sprocket wheel 16 is secured on the other end of this shaft and is connected by a sprocket chain to a sprocket wheel 17 secured on a stub shaft extending from one end of the feed roll 3. The sprocket chain which passes about the sprocket wheels 13 and 14 also passes about an idler sprocket wheel 18 mounted on a stub shaft 19 carried by a bracket 20 which is suitably secured to the frame of the combine. The stub shaft 19 is adjustable in bracket 20, in a suitable manner to take up undesirable slack in the sprocket chain. This sprocket chain is driven in any suitable or preferred manner as from the shaft for driving the header. Obviously, the drive for this chain may be taken from any other suitable shaft or driven part of the machine.

The beater 7 is driven in a counterclockwise direction, as considered in Figure 2, the accelerating feed roll 3 being driven in a clockwise direction, as considered in this figure of the drawings.

During operation of the machine, the greater part of the cut grain, including the straw, is deposited upon one side of the feed conveyor 2 and forms a relatively high pile or stack thereon. As this stack advances with the conveyor, it is engaged by the beater 7 which, due to the spiral arrangement of the blades 12, acts in a manner to shift a part of the cut grain toward the opposite side of the feed conveyor and to distribute it substantially uniformly throughout approximately the full width thereof.

In this mamnner, we assure substantially uniform delivery of the cut grain to the cylinder and concave throughout the whole length thereof. This avoids slugging of the cylinder and improper cleaning and separation and also greatly increases the efficiency of the machine since the entire length of the cylinder and concave is employed and the entire width of the straw rack, sieves and associated agitating and separating mechanism is utilized.

Figure 3:
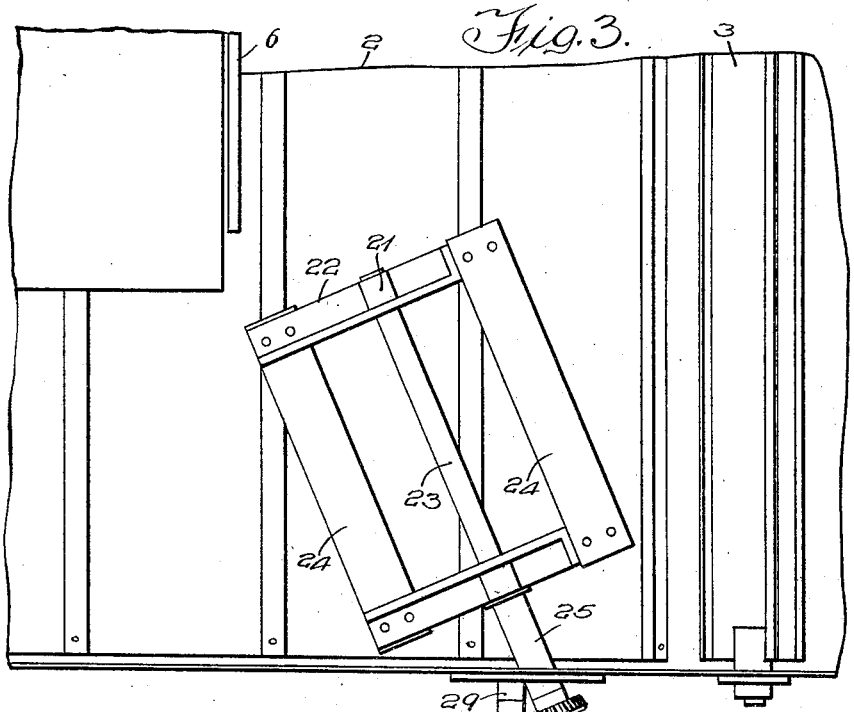
Figure 3 is a fragmentary plan view, similar to Figure 1, illustrating a modified form of our invention.

While we prefer to employ the spiral form of beater illustrated in Figures 1 and 2, it is not essential that a beater of this particular construction be employed, since it is feasible to employ a beater having straight blades disposed at an inclination across the feed conveyor. One form of such a beater is illustrated in Figure 3. In this form, the beater comprises heads 21 provided with diametrically opposite and radially extending arms 22, these heads being pinned or otherwise suitably secured on the shaft 23. The arms 22 of the heads are aligned lengthwise of shaft 23 and are connected by spaced blades or vanes 24 suitably secured thereto. Shaft 23 is rotatably mounted in a bearing sleeve 25 suitably secured to house 1. This sleeve is disposed at an inclination transversely of feed conveyor 2, so that the shaft 23 and blades 24 of the beater are also disposed at an inclination transversely of the feed conveyor.

A bevel gear 26 is secured on the outer end of shaft 23 and meshes with a pinion 27 rotatably mounted on a stub shaft 28 extending from a bracket 29 secured to the side of house 1.

A sprocket wheel 30 is also rotatably mounted on the stub shaft 29 and is confined between the neck of pinion 27 and a stop collar 31 suitably secured to shaft 28. Pinion 27 is connected to sprocket wheel 30 to turn therewith, in a suitable manner, as by being clutched to the hub of the sprocket wheel, or the sprocket wheel and the pinion may be formed integrally, if desired.

The sprocket wheel 30 is driven by a sprocket chain, from a suitable takeoff on the combine, the drive being such that the sprocket wheel rotates in a clockwise direction, as considered in Figure 3. This rotates the beater in a counter-clockwise direction, as considered in this figure, and the blades 24 of this beater act to shift a part of the cut grain transversely of the feed conveyor 2 toward the opposite side thereof in much the same manner as the blades of the beater 7 act. This serves to distribute the grain substantially uniformly and approximately throughout the entire width of the feed conveyor 2, with the attendant advantages heretofore enumerated.

As above indicated, and as will be understood by those skilled in the art, changes in the construction and arrangement of parts of our invention can be resorted to without departing from the field and scope of the same, and we intend to include all such variations, as fall within the scope of the appended claims, in this application in which the preferred forms only of our invention are disclosed.

What we claim is:

1. In combination in a combined harvesting and threshing machine, a cylinder and concave, means comprising a feed conveyor for delivering the cut grain to the cylinder and concave, means for delivering the cut grain in a loose and unbound condition to the feed conveyor at one side thereof, and a beater mounted to rotate on an axis and extending above and transversely of the conveyor at said side thereof, said beater comprising blades disposed lengthwise and at opposite sides of the axis thereof, said blades extending across said axis and being oppositely related for shifting the cut grain from the side of the conveyor at which the grain is delivered toward the other side of the conveyor, the respective blades having less than a complete turn about the axis of the beater, and the outer edges of the blades being smooth and continuous.

2. In combination in a combined harvesting and threshing machine, a cylinder and concave, means comprising a feed conveyor for delivering cut grain to the cylinder and concave, means for delivering the cut grain in a loose and unbound condition onto the conveyor at one side thereof, and a rotating beater above the conveyor and including a shaft having spirally arranged elements disposed on diametrically opposed sides of said shaft and terminating at the center of said conveyor to engage the grain upon such side of the conveyor and shift it toward the other side of the conveyor, said elements being free of obstructions to travel of the cut grain therealong.

3. In combination in a combined harvesting and threshing machine, a cylinder and concave, means comprising a feed conveyor for delivering cut grain to the cylinder and concave, means for delivering the cut grain in a loose and unbound condition onto the conveyor at one side thereof, and a rotating beater above the conveyor and including a shaft having spirally arranged elements disposed on diametrically opposite sides thereof and extending only to the center of said conveyor to engage the grain upon such side of the conveyor and shift it toward the other side of the conveyor, the outer edge of said elements being uninterrupted and free of obstructions to travel of the cut grain therealong.

In witness whereof, we hereunto subscribe our names this 6th day of March, 1929.

EARL W. MENTOR.
CHARLES J. SCRANTON, Jr.